United States Patent
Das et al.

(10) Patent No.: US 10,070,447 B1
(45) Date of Patent: Sep. 4, 2018

(54) METHOD AND APPARATUS FOR ENHANCED REFERENCE (RSTD) MEASUREMENT FOR LONG TERM EVOLUTION (LTE) POSITIONING

(71) Applicant: Samsung Electronics Co., Ltd., Gyeonggi-do (KR)

(72) Inventors: Abhik K. Das, San Diego, CA (US); Dongwoon Bai, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/601,366

(22) Filed: May 22, 2017

Related U.S. Application Data

(60) Provisional application No. 62/466,096, filed on Mar. 2, 2017.

(51) Int. Cl.
| | | |
|---|---|---|
| *G01S 5/02* | (2010.01) | |
| *H04W 72/08* | (2009.01) | |
| *H04W 72/12* | (2009.01) | |
| *G06F 17/14* | (2006.01) | |
| *H04W 8/08* | (2009.01) | |
| *H04B 7/26* | (2006.01) | |
| *H04Q 3/00* | (2006.01) | |
| *H04J 11/00* | (2006.01) | |

(52) U.S. Cl.
CPC ........ *H04W 72/082* (2013.01); *G01S 5/0221* (2013.01); *G01S 5/0263* (2013.01); *G01S 5/0273* (2013.01); *G06F 17/141* (2013.01); *H04B 7/26* (2013.01); *H04Q 3/0062* (2013.01); *H04W 8/085* (2013.01); *H04W 72/12* (2013.01); *H04J 2011/0096* (2013.01)

(58) Field of Classification Search
CPC ... H04W 72/082; H04W 72/12; H04W 8/085; H04Q 3/0062; G01S 5/0221; G01S 5/0263; G01S 5/0273; G06F 17/141; H04B 7/26; H04J 2011/0096
See application file for complete search history.

(56) References Cited

U.S. PATENT DOCUMENTS

| | | | |
|---|---|---|---|
| 7,784,015 B2 * | 8/2010 | Pitts | G06F 17/5072 430/5 |
| 7,881,392 B2 | 2/2011 | Li | |
| 8,009,745 B2 | 8/2011 | Glazko et al. | |
| 8,175,123 B2 | 5/2012 | Vrcelj et al. | |
| 8,948,028 B2 | 2/2015 | Zhang et al. | |

(Continued)

FOREIGN PATENT DOCUMENTS

| | | |
|---|---|---|
| KR | 1020120015851 | 2/2012 |
| KR | 1020120047694 | 5/2012 |

*Primary Examiner* — Kenneth Lam
(74) *Attorney, Agent, or Firm* — The Farrell Law Firm, P.C.

(57) ABSTRACT

A method and apparatus are provided. The method includes receiving reference signal resource elements from a transceiver, determining a channel impulse response (CIR) signal based on the received reference signal resource elements, estimating a coarse value of a FAP of the reference signal resource elements based on the CIR signal, estimating a fine value of the FAP of the reference signal resource elements based on CIR samples around the FAP location, and combining the coarse value estimate and the fine value estimate to determine the FAP estimate.

16 Claims, 6 Drawing Sheets

(56) References Cited

U.S. PATENT DOCUMENTS

| | | | |
|---|---|---|---|
| 9,746,832 B1* | 8/2017 | Yao | G04F 10/005 |
| 9,866,411 B1* | 1/2018 | Song | H04L 25/03057 |
| 2002/0097813 A1* | 7/2002 | Vaidyanathan | H04L 27/0014 |
| | | | 375/326 |
| 2005/0251359 A1* | 11/2005 | Cao | G06F 11/263 |
| | | | 702/120 |
| 2010/0040043 A1* | 2/2010 | Li | H04L 27/2656 |
| | | | 370/350 |
| 2010/0194399 A1* | 8/2010 | Cho | G11C 29/56 |
| | | | 324/501 |
| 2014/0112378 A1* | 4/2014 | Ji | H04L 27/266 |
| | | | 375/219 |
| 2014/0269883 A1* | 9/2014 | Thompson | H04L 25/0204 |
| | | | 375/232 |
| 2016/0155722 A1* | 6/2016 | Leedy | H01L 25/0657 |
| | | | 257/686 |
| 2017/0331654 A1* | 11/2017 | Song | H04L 27/2334 |
| 2018/0020464 A1* | 1/2018 | Liang | H04W 72/1231 |

* cited by examiner

METHOD AND APPARATUS FOR ENHANCED REFERENCE (RSTD) MEASUREMENT FOR LONG TERM EVOLUTION (LTE) POSITIONING

PRIORITY

This application claims priority under 35 U.S.C. § 119(e) to U.S. Provisional Patent Application No. 62/466,096 which was filed in the U.S. Patent and Trademark Office on Mar. 2, 2017, the entire content of which is incorporated herein by reference.

FIELD

The present disclosure relates generally to wireless communication systems, and more particularly, to a method and apparatus for enhanced reference signal time difference (RSTD) measurement for long term evolution (LTE) positioning.

BACKGROUND

Determining an accurate position of a mobile device such as a smart phone is important in providing location based services. The location of a smartphone may be determined using the service provider's network infrastructure in combination with measurements provided by the smartphone. Observed time difference of arrival (OTDOA) is a positioning feature introduced in the 3rd generation partnership project (3GPP) Release 9 evolved universal terrestrial radio access (E-UTRA), also referred to as long term evolution (LTE). OTDOA is a multilateration method in which a user equipment (UE), such as a smartphone, measures the time difference between specific signals from several eNodeBs (base stations) and reports these time differences to an evolved serving mobile location center (ESMLC) in the LTE network. The ESMLC calculates the UE's position based on such time differences and knowledge of the eNodeB's location.

OTDOA-based positioning has been an integral part of long term evolution (LTE) networks. The increasing usage of smartphones and location based services has made more precise positioning requirements desirable, especially indoors where global positioning system (GPS) signals may not be available. 3GPP Release 14 has sought to achieve higher positioning resolution and accuracy through a work item to enhance the OTDOA-based positioning method in existing LTE networks in which the resolution of the positioning report sent by the UE is increased. In general, the positioning accuracy requirements for LTE are expected to become more stringent in future 3GPP releases.

SUMMARY

According to an aspect of the present disclosure, a method is provided which includes receiving reference signal resource elements from a transceiver, determining a channel impulse response (CIR) signal based on the received reference signal resource elements, estimating a coarse value of a first arrival path (FAP) of the reference signal resource elements based on a peak of the CIR signal, estimating a fine value of the FAP of the reference signal resource elements based on CIR samples around the FAP location, and combining the coarse value estimate and the fine value estimate to determine the FAP estimate.

According to another aspect of the present disclosure, an apparatus is provided which includes a memory, a receiver and a processor configured to receive reference signal resource elements from a transceiver, determine a CIR signal based on the received reference signal resource elements, estimate a coarse value of a first arrival path (FAP) of the reference signal resource elements based on a peak of the CIR signal, estimate a fine value of the FAP of the reference signal resource elements based on CIR samples around the FAP location, and combine the coarse value estimate and the fine value estimate to determine the FAP estimate.

According to another aspect of the present disclosure, a method of manufacturing a processor is provided which includes forming the processor as part of a wafer or a package that includes at least one other processor, wherein the processor is configured to receive reference signal resource elements from a transceiver, determine a CIR signal based on the reference signal resource elements, estimate a coarse value of a first arrival path (FAP) of the reference signal resource elements based on a peak of the CIR signal, estimate a fine value of the FAP of the reference signal resource elements based on CIR samples around the FAP location, and combine the coarse value estimate and the fine value estimate to determine the FAP estimate.

According to another aspect of the present disclosure, a method of constructing an integrated circuit is provided, which includes generating a mask layout for a set of features for a layer of the integrated circuit, wherein the mask layout includes standard cell library macros for one or more circuit features that include a processor configured to receive reference signal resource elements from a transceiver, determine a CIR signal based on the reference signal resource elements, estimate a coarse value of a first arrival path (FAP) of the reference signal resource elements based on a peak of the CIR signal, estimate a fine value of the FAP of the reference signal resource elements based on CIR samples around the FAP location, and combine the coarse value estimate and the fine value estimate to determine the FAP estimate.

BRIEF DESCRIPTION OF THE DRAWINGS

The above and other aspects, features and advantages of the present disclosure will become more apparent from the following detailed description, when taken in conjunction with the accompanying drawings, in which.

DETAILED DESCRIPTION

The present disclosure will now be described more fully hereinafter with reference to the accompanying drawings, in which embodiments of the present disclosure are shown. This disclosure may, however, be embodied in many different forms and should not be construed as limited to the embodiments set forth herein. Rather, these embodiments are provided so that this disclosure will be thorough and complete, and will fully convey the scope of the device and method to those skilled in the art. Like reference numbers refer to like elements throughout.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. As used herein, the term "and/or" includes, but is not limited to, any and all combinations of one or more of the associated listed items.

It will be understood that, although the terms first, second, and other terms may be used herein to describe various elements, these elements should not be limited by these terms. These terms are only used to distinguish one element from another. For example, a first signal may be referred to as a second signal, and, similarly a second signal may be referred to as a first signal without departing from the teachings of the disclosure.

The terminology used herein is for the purpose of describing particular embodiments only and is not intended to limit the present device and method. As used herein, the singular forms "a", "an" and "the" are intended to include the plural forms as well, unless the context clearly indicates otherwise. It will be further understood that the terms "comprises" and/or "comprising," or "includes, but is not limited to" and/or "including, but not limited to "when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including, but not limited to technical and scientific terms) used herein have the same meanings as commonly understood by one of ordinary skill in the art to which the present device and method belongs. It will be further understood that terms, such as those defined in commonly used dictionaries, should be interpreted as having meanings that are consistent with their meaning in the context of the relevant art and/or the present description, and will not be interpreted in an idealized or overly formal sense unless expressly so defined herein.

Figure 1:
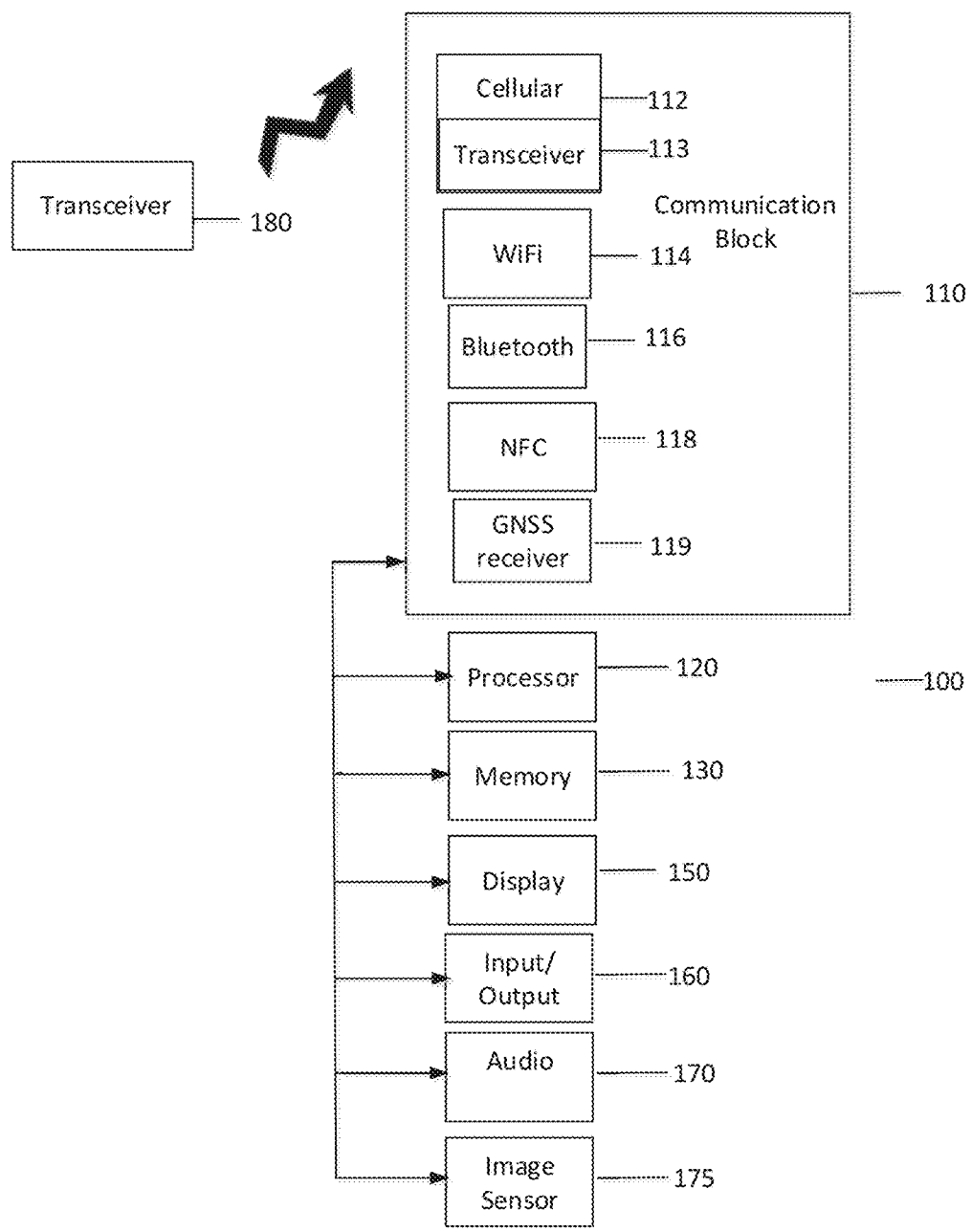
FIG. 1 illustrates an exemplary block diagram of an electronic device in a communication network, according to one embodiment.

FIG. 1 illustrates an exemplary block diagram of an electronic device in a network environment, according to one embodiment.

Referring to FIG. 1, an electronic device 100 includes, but is not limited to, a communication block 110, a processor 120, a memory 130, a display 150, an input/output block 160, an audio block 170, an image sensor 175 and a wireless transceiver 180. The wireless transceiver 180 may be included in a vehicle, an access point, a mobile electronic device or a cellular base station (such as an eNodeB) and includes, but is not limited to, a wireless transmitter and receiver.

The electronic device 100 includes a communication block 110 for connecting the device 100 to another electronic device or a network for communication of voice and data. The communication block 110 provides general packet radio service (GPRS), LTE, enhanced data rates for GSM evolution (EDGE), cellular, wide area, local area, personal area, near field, device to device (D2D), machine to machine (M2M), satellite, enhanced mobile broad band (eMBB), massive machine type communication (mMTC), ultra-reliable low latency communication (URLLC), narrowband Internet of things (NB-IoT), V2X and short range communications.

The functions of the communication block 110, or a portion thereof including a transceiver 113, may be implemented by a chipset. In particular, the cellular communications block 112 provides a wide area network connection through terrestrial base transceiver stations or directly to vehicle or other electronic devices, using technologies such as second generation (2G), GPRS, EDGE, D2D, M2M, LTE, fifth generation (5G), long term evolution advanced (LTE-A), code division multiple access (CDMA), wideband code division multiple access (WCDMA), universal mobile telecommunications system (UMTS), wireless broadband (Wi-Bro), V2X and global system for mobile communication (GSM). The cellular communications block 112 includes, but is not limited to, a chipset and the transceiver 113. The transceiver 113 includes, but is not limited to, a transmitter and a receiver. The wireless fidelity (WiFi) communications block 114 provides a local area network connection through network access points using technologies such as IEEE 802.11. The Bluetooth® communications block 116 provides personal area direct and networked communications using technologies such as IEEE 802.15 and Bluetooth™ low energy (BLE) long range (LR). The near field communications (NFC) block 118 provides point to point short range communications using standards such as ISO/IEC 14443. The communication block 110 also includes a GNSS receiver 119. The GNSS receiver 119 supports receiving signals from a satellite transmitter.

The electronic device 100 may receive electrical power for operating the functional blocks from a power supply, including, but not limited to, a battery. The wireless transceiver 180 may be a part of a terrestrial base transceiver station (BTS) (such as a cellular base station) and include a radio frequency transmitter and receiver conforming to third generation partnership project (3GPP) standards. The wireless transceiver 180 may provide data and voice communications services to users of mobile user equipment (UE). In the present disclosure, the term "UE" may be used interchangeably with the term "electronic device".

The processor 120 provides application layer processing functions required by the user of the electronic device 100. The processor 120 also provides command and control functionality for the various blocks in the electronic device 100. The processor 120 provides for updating control functions required by the functional blocks. The processor 120 may provide for coordination of resources required by the transceiver 113 including, but not limited to, communication control between the functional blocks. The processor 120 may also update the firmware, databases, lookup tables, calibration method programs and libraries associated with the cellular communications block 112 or Bluetooth® block 116.

The memory 130 provides storage for device control program code, user data storage, application code and data storage. The memory 130 may provide data storage for the firmware, libraries, databases, lookup tables, algorithms, methods, channel estimation parameters, FAP estimation parameters and calibration data required by the cellular communications block 112 or Bluetooth® block 116. The program code and databases required by the cellular communications block 112 or Bluetooth® block 116 may be loaded into local storage from the memory 130 upon device boot up. The cellular communications block 112 or Bluetooth® block 116 may also have local, volatile and non-volatile memory for storing the program code, libraries, databases, calibration data and lookup table data.

The display 150 may be a touch panel, and may be embodied as a liquid crystal display (LCD), organic light emitting diode (OLED) display, active matrix OLED (AMOLED) display, and the like. The input/output block 160 controls the interface to the user of the electronic device 100. The audio block 170 provides for audio input and output to/from the electronic device 100.

The wireless transceiver 180 may be included in an access point or base station that is used to receive, transmit or relay wireless signals. The wireless transceiver 180 may facilitate communication with the electronic device 100 by sending, receiving, and relaying data communication signals to and from the electronic device 100. The electronic device 100 may be connected to a network through the wireless transceiver 180. For example, the wireless transceiver 180 may be an access point, a cell tower, a wireless router, an antenna, multiple antennas, or a combination thereof being used to send signals to, or receive signals from, the electronic device 100, such as a smartphone. The wireless transceiver 180 may relay the wireless signals through the network to enable communication with other electronic devices 100 such as user equipment (UE), vehicles, servers or a combination thereof. The wireless transceiver 180 may be used to transmit the communication signals, such as voice or data.

OTDOA in LTE is based on the UE measuring a signal reception time observed between reference signals of neighboring cells and the reference signals of the serving cell, the measurement may be referred to as a reference signal time difference (RSTD) measurement. The reference signal is generally a PRS in LTE; however, signals other than PRS may be used. The PRS may be contained in positioning subframes of an LTE frame. The positioning subframes are designed to improve the probability of a UE to receive the positioning subframe of neighbor cells by reducing the signal interference and increasing resource element (RE) energy. Typically, the positioning subframes do not carry any physical downlink shared channel (PDSCH) data and provide the PRS in addition to a cell specific reference signal (CRS).

Figure 2:
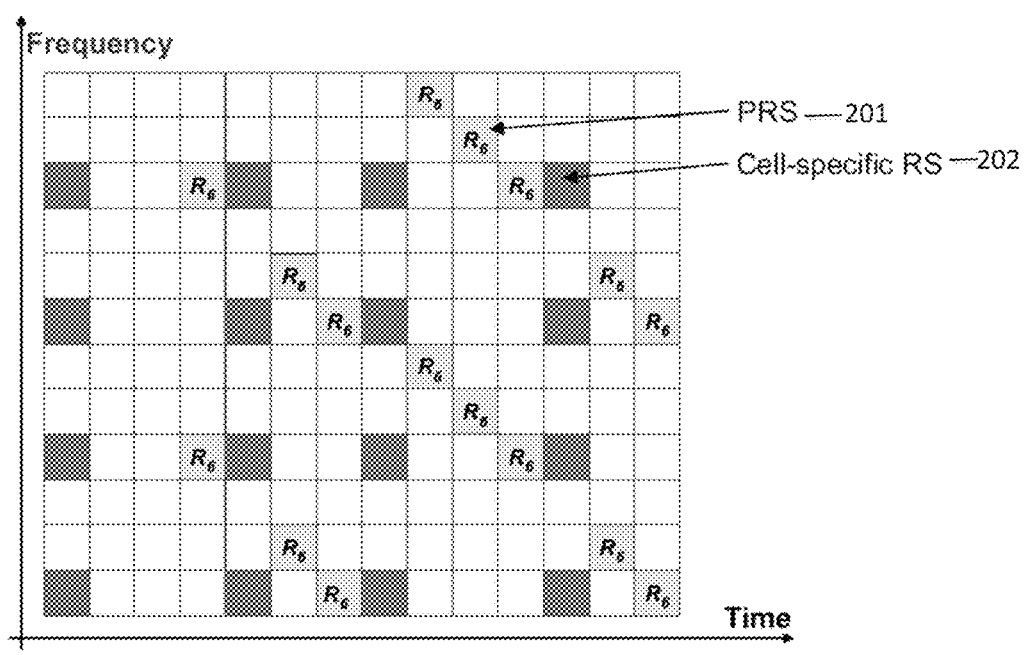
FIG. 2 illustrates an exemplary diagram of the LTE resource elements associated with a positioning reference signal (PRS), according to one embodiment.

FIG. 2 illustrates an exemplary diagram of the LTE resource elements associated with a PRS, according to one embodiment.

Referring to FIG. 2, a PRS 201 sequence is constructed in a similar manner as a CRS 202, based on a cell identifier (ID). The positioning subframes occur in groups of consecutive downlink (DL) subframes known as positioning occasions, including between one and six positioning subframes, and the positioning occasions have a periodicity of 160, 320, 640 or 1280 subframes (or milliseconds).

A typical metric for the signal reception time observed by a UE receiver for a cell is a first arrival path (FAP) of a channel impulse response (CIR) between the eNodeB and the UE. The PRS transmitted by the eNodeB of a cell may be used to determine the CIR and estimate the FAP. Based on the FAP, an RSTD measurement for a neighbor cell is defined as the difference between the PRS-based FAP estimates of the neighbor cell and the serving cell. In order to increase the resolution and accuracy of enhanced positioning, it is desirable to have a CIR-based FAP estimator that increases the resolution of FAP estimates and RSTD estimates and reduces estimation error at an increased resolution level.

According to one embodiment, the present system and method provides a FAP estimation for RSTD measurement in LTE based on the CIR signal observed between an eNodeB and a UE receiver. The CIR signal from the eNodeB may be determined using reference signal resource elements, such as those of a PRS, that are transmitted by the eNodeB. In a multi-path channel environment and noise-free setting, the location of the first peak (the location refers to a point in time domain) of the CIR signal represents the FAP value.

The present method first estimates a coarse value of the FAP by detecting the first peak of the CIR signal and then estimating a fine value of the FAP using a form of interpolation applied to the CIR samples around the detected first peak. The present method further combines the coarse value estimate and the fine value estimate to determine the FAP estimate. The present FAP estimation method may be applied to a single-path channel environment (e.g., additive white Gaussian noise (AWGN)) where peak detection is used to estimate the coarse value of the FAP. There is only one peak in the CIR signal in the single-path channel environment. Furthermore, the present FAP estimation method may be applied to a multi-path channel environment provided the first two channel taps are sufficiently spaced apart in time in a CIR domain.

Given an integer a and an even integer N>0, $(a)_N$ may be defined as $$(a)_N = \left(a + \frac{N}{2}\right) \bmod N - \frac{N}{2},$$

where mod N represents a modulo operation with a range of: $\{0, 1, \ldots, N-1\}$. Therefore, $(a)_N$ has values in the range of:

$$\left\{-\frac{N}{2}, \ldots, \frac{N}{2} - 1\right\}$$

and $(a \pm N)_N = (a)_N$.

In a multi-path channel environment with L multi-paths (L is an integer) a time-domain signal representation of the channel may be expressed by Equation (1):

$$h(t, \tau) = \sum_{l=0}^{L-1} h_l(t)\delta(t - \tau_l), \qquad (1)$$

where $h_l(t)$ and $\tau_l$ denote the channel gain and delay for the lth multi-path (or tap) respectively. If an N-point inverse discrete Fourier transform (IDFT) is applied to the reference signal symbols, $$\left\{X_n : -\frac{N}{2} \le n \le \frac{N}{2} - 1\right\},$$

an orthogonal frequency-division multiplexing (OFDM) signal may be expressed by Equation (2):

$$x(t) = \sum_{n=-\frac{N}{2}}^{\frac{N}{2}-1} X_n \exp\left(j\frac{2\pi n}{NT}(t-GT)\right), 0 \le t \le (N+G)T, \quad (2)$$

where T is the OFDM sampling time duration and G is the cyclic prefix (CP) length in samples. In an LTE system, $T=(2048/N) \times T_s$, where $T_s=1/(15000 \times 2048)$sec. Therefore, the received signal observed by a UE may be expressed by Equation (3):

$$y(t) = \int h(t,\tau)x(t-\tau)d\tau + w(t) = \sum_{l=0}^{L-1} h_l x(t-\tau_l)w(t), \quad (3)$$

where w(t) is an AWGN signal. Note that it is assumed that the channel is static during the entire time duration of the OFDM symbol, i.e., $h_l(t)$ takes a constant value for $0 \le t \le (N+G)T$; so the time index t is removed from Equation (3) for notational convenience and we set $h_l = h_l(t)$. Then the time-sampled version of the received signal observed by a UE may be expressed by Equation (4):

$$y(t)|_{t=(k+G)T} = \sum_{l=0}^{L-1} h_l x((k+G-\theta_l)T) + w((k+G)T), \quad (4)$$

$$= \sum_{n=-\frac{N}{2}}^{\frac{N}{2}-1} \left( X_n \sum_{l=0}^{L-1} h_l \exp\left(-j\frac{2\pi n \theta_l}{N}\right) \right) \exp\left(j\frac{2\pi nk}{N}\right) + w_k,$$

where $\tau_l = \theta_l T$. Therefore, performing a discrete Fourier transform (DFT) of the received signal results in the frequency-domain form expressed by Equation (5):

$$Y_n = X_n \sum_{l=0}^{L-1} h_l \exp\left(-j\frac{2\pi n \theta_l}{N}\right) + W_n = H_n(\theta)X_n + W_n, -\frac{N}{2} \le n < \frac{N}{2}, \quad (5)$$

where $W_n$ is AWGN and $\theta = [\theta_0, \theta_1, \ldots, \theta_{L-1}]$. Without loss of generality, it is assumed that to $\tau_0 \le \tau_1 \le \ldots \le \tau_{L-1}$ (so that $\theta_0 \le \theta_1 \le \ldots \le \theta_{L-1}$). The present FAP estimation method estimates FAP $\theta_0$ using the set of samples $$\left\{ Y_n : -\frac{N}{2} \le n < \frac{N}{2} \right\}.$$

In an LTE system, since the reference signal used for FAP estimation is a PRS, $X_n$ is known and descrambling may be performed resulting in Equation (6):

$$Y'_n = Y_n X_n^{-1} = H_n(\theta) + W'_n, -\frac{N}{2} \le n < \frac{N}{2}, \quad (6)$$

where $W'_n = W_n X_n^{-1}$.

To estimate $\theta_0$ from $$\left\{ Y'_n : -\frac{N}{2} \le n < \frac{N}{2} \right\},$$

the present method determines the inverse discrete Fourier transform (IDFT) of the observed samples and performs the estimation procedure in the IDFT domain. The present method performs FAP estimation based on the CIR signal determined after performing an IDFT of the frequency domain samples. If an M-point IDFT is applied to $$\left\{ Y'_n : -\frac{N}{2} \le n < \frac{N}{2} \right\}$$

(via zero-padding if required), where M=cN and c is an integer $\ge 1$ (and a power of 2), the resulting CIR signal may be expressed by Equation (7):

$$y_k = \sum_{n=-\frac{M}{2}}^{\frac{M}{2}-1} H_n(\theta) \exp\left(j\frac{2\pi nk}{M}\right) + w'_k = \sum_{l=0}^{L-1} h_l g_M(k-c\theta_l) + w'_k, \quad (7)$$

$$-\frac{M}{2} \le n < \frac{M}{2},$$

where $$g_M(x) = \exp\left(-j\frac{\pi x}{M}\right) \frac{\sin(\pi x)}{\sin(\pi x/M)}$$

and $w'_n$ is Gaussian noise. For integer $x \ne 0$, $g_M(x)=0$.

According to one embodiment, the present method estimates an integer part of $c\theta_0$ (or a coarse value of the FAP) at a first stage, and a fractional part of $c\theta_0$ (or fine value of the FAP) at a second stage, based on the coarse value FAP estimate from the first stage.

For a single-path channel model (L=1), the resulting CIR signal may be expressed by Equation (8):

$$y_k = h_0 g_M(k - c\theta_0) + w'_k. \quad (8)$$

If $c\theta_0$ is an integer, the resulting CIR signal may be expressed by Equation (9):

$$y_k = h_0 M \cdot \delta(k - c\theta_0) + w'_k, \quad (9)$$

where $\delta(\cdot)$ is a discrete delta function.

$\theta_0$ may be estimated as $$\hat{\theta}_0 = \frac{1}{c} \cdot \operatorname*{argmax}_k |y_k|,$$

i.e., as the peak value of the CIR sequence, $$\left\{ y_k : -\frac{M}{2} \le k < \frac{M}{2} \right\}$$

(after taking the absolute values of its elements). The present method may apply peak detection to estimate the integer part of $c\theta_0$ for a single-path channel. The present method may further apply peak detection to estimate the coarse value of the FAP for a multi-path channel environment. For a multi-path channel environment, there may be multiple peaks in the CIR and the integer part of $c\theta_0$ may be determined by the first detected peak in the CIR signal. The present method further determines the fine value of the FAP using an interpolation method of the CIR samples around the detected first peak. In particular, the present method may use phase information and/or magnitude information of the CIR samples around the detected first peak.

In a single-path channel environment, the number of peaks L=1 and therefore, the CIR signal may be expressed by Equation (10):

$$y_k = h_0 g_M(k - c\theta_0) + w'_k, \ -\frac{M}{2} \leq n < \frac{M}{2}. \quad (10)$$

According to one embodiment, the present FAP estimation method determines the FAP $\theta_0$ using the set of samples $$\left\{ y_k : -\frac{M}{2} \leq k < \frac{M}{2} \right\}.$$

When $c\theta_0 = k_p + \Delta$, in which $-0.5 \leq \Delta \leq 0.5$ and $k_p$ is an integer, $k_p$ may be referred to as the coarse value of the FAP and $\Delta$ may be referred to as the fine value of the FAP. The present method determines the coarse value of the FAP from the peak location of the CIR, i.e., $$\hat{k}_p = \underset{k}{\mathrm{argmax}} |y_k|.$$

The present method may further estimate a fine value of the FAP. The CIR samples at indices $k_p$, $(k_p+1)_M$, $(k_p-1)_M$, i.e., $y_{k_p} = h_0 g_M(-\Delta)$, $y_{(k_p+1)_M} = h_0 g_M(1-\Delta)$, $y_{(k_p-1)_M} = h_0 g_M(-1-\Delta)$ may be used to determine the correlations expressed by Equations (11), (12) and (13):

$$R_1 = Re(y_{(k_p+1)_M} y^*_{k_p}) = |h_0|^2 g_M(1-\Delta)(g_M(-\Delta))^* + \text{noise terms}, \quad (11)$$

$$R_{-1} = Re(y_{(k_p-1)_M} y^*_{k_p}) = |h_0|^2 g_M(-1-\Delta)(g_M(-\Delta))^* + \text{noise terms}, \quad (12)$$

$$R_0 = Re(y_{k_p} y^*_{k_p}) = |h_0|^2 g_M(-\Delta)(g_M(-\Delta))^* + \text{noise terms}. \quad (13)$$

If the noise terms are assumed to be absent (i.e., noiseless case), the correlation ratios $$\gamma_1 = \frac{R_1}{R_0 \cos\left(\frac{\pi}{M}\right)} \text{ and } \gamma_{-1} = \frac{R_{-1}}{R_0 \cos\left(\frac{\pi}{M}\right)}$$

may be simplified as expressed by Equations (14) and (15):

$$\gamma_1 = \frac{-\sin\left(\frac{\pi\Delta}{M}\right)}{\sin\left(\frac{\pi(\Delta-1)}{M}\right)} = \frac{-\sin\left(\frac{\pi\Delta}{M}\right)}{\sin\left(\frac{\pi\Delta}{M}\right)\cos\left(\frac{\pi}{M}\right) - \cos\left(\frac{\pi\Delta}{M}\right)\sin\left(\frac{\pi}{M}\right)}, \quad (14)$$

$$\gamma_{-1} = \frac{-\sin\left(\frac{\pi\Delta}{M}\right)}{\sin\left(\frac{\pi(\Delta+1)}{M}\right)} = \frac{-\sin\left(\frac{\pi\Delta}{M}\right)}{\sin\left(\frac{\pi\Delta}{M}\right)\cos\left(\frac{\pi}{M}\right) + \cos\left(\frac{\pi\Delta}{M}\right)\sin\left(\frac{\pi}{M}\right)}. \quad (15)$$

The correlation ratios expressed by Equations (14) and (15) may be combined and a closed-form expression for the estimator $\hat{\Delta}$ may be expressed by Equations (16) and (17):

$$(\gamma_1 + \gamma_{-1})\tan\left(\frac{\pi\Delta}{M}\right) - (\gamma_1 - \gamma_{-1})\tan\left(\frac{\pi}{M}\right) = -2\frac{\tan(\pi\Delta)}{\cos\left(\frac{\pi}{M}\right)} \quad (16)$$

$$\bullet \hat{\Delta} = \frac{M}{\pi} \tan^{-1}\left( \frac{(R_1 - R_{-1})\tan\left(\frac{\pi}{M}\right)}{2R_0 + R_1 + R_{-1}} \right) \quad (17)$$

The estimator $\hat{\Delta}$ above may be referred to as a 3-point interpolator.

For a single-path channel environment, the present system estimates a coarse value of the FAP using peak detection on the CIR sequence according to $$\hat{k}_p = \underset{k}{\mathrm{argmax}} |y_k|.$$

The present system estimates a fine value of the FAP using the CIR samples at indices $\hat{k}_p$, $(k_p+1)_M$ and $(k_p-1)_M$ according to Equation (17) above. The present system combines the coarse value and the fine value of the FAP to determine an estimate for the FAP according to $\hat{\theta}_0 = (k_p + \hat{\Delta})/c$.

In a multi-path channel environment with L multi-paths, there are L peaks in the CIR in a noiseless condition. The present method determines a coarse value of the FAP by the location of the first peak. According to one embodiment, the present method estimates a coarse value of the FAP based on a sliding time window approach with an adaptive amplitude threshold to detect the first peak of the CIR. However, the present method may apply any approach to determine a coarse FAP estimate without deviating from the scope of the present disclosure. For a multi-path channel environment, the present system estimates a coarse value of the FAP using a first peak detection of the CIR sequence to determine $\hat{k}_p$. The present system estimates a fine value of the FAP using the CIR samples at indices $\hat{k}_p$, $(k_p+1)_M$ and $(k_p-1)_M$ according to Equation (17) above. The present system combines the coarse value and the fine value of the FAP to determine an estimate for the FAP according to $\hat{\theta}_0 = (\hat{k}_p + \hat{\Delta})/c$.

Figure 3:
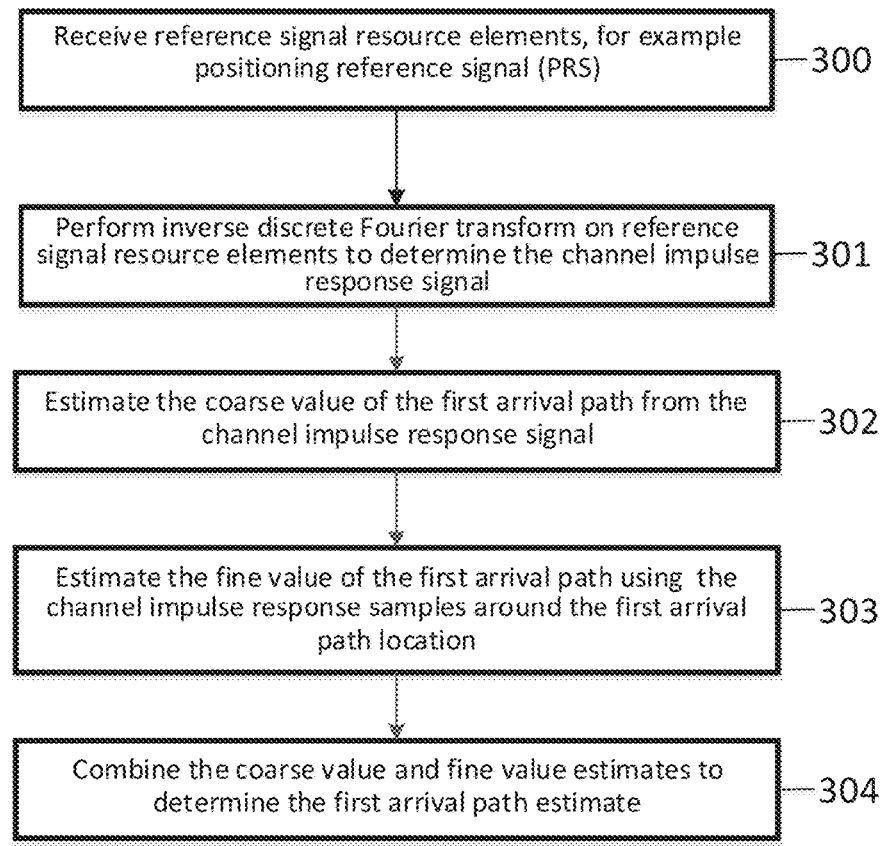
FIG. 3 illustrates an exemplary flowchart of the present first arrival path (FAP) estimation method for a single-path channel environment and a multi-path channel environment, according to one embodiment.

FIG. 3 illustrates an exemplary flow chart for the present FAP estimation method for a single-path channel environment and a multi-path channel environment, according to one embodiment.

Referring to the flowchart of FIG. 3, the present method, at 300, receives a reference signal such as a PRS. At 301, the method performs an IDFT of the reference signal resource elements to determine the CIR signal. At 302, the method estimates the coarse value of the FAP from the CIR signal. At 303, the method estimates the fine value of the FAP using the CIR samples around the FAP location. At 304, the method combines the coarse value and fine value estimates to determine the FAP.

The present method may estimate a fine value of the FAP using a 3-point interpolator approach with three CIR samples to determine the estimate for a fine value of the FAP. However, the present method may use any number of CIR samples in the interpolator for estimating the fine value of the FAP, without deviating from the scope of the present disclosure.

According to one embodiment, the present method provides iterative FAP estimation for a multi-path channel environment. The present method may provide iterative FAP estimation for any number of multi-paths, L, without deviating from the scope of the present disclosure. The present method may have prior information of the number of multipaths, L, or an upper bound of the number of multipaths, or may use additional preprocessing methods to detect the number of peaks in the CIR. In a two-path channel environment (L=2), a CIR signal may be expressed by Equation (18):

$$y_k = h_0 g_M(k - c\theta_0) + h_1 g_M(k - c\theta_1) + w'_k, -\frac{M}{2} \le k < \frac{M}{2} \quad (18)$$

and without loss of generality, the first peak is assumed as the largest peak in CIR signal ($|h_0|>|h_1|$).

Each $h_l g_M(k-c\theta_l)$ term may be referred to as a 'peak' and ($h_l$, $\theta_l$) may be referred to as the parameters of the lth peak, where l=0, 1 representing the two channel paths. With $c\theta_0=k_{p0}+\Delta_0$, $c\theta_1=k_{p1}+\Delta_1$, where $k_{p0}$ and $k_{p1}$ are integers representing the coarse values of the channel tap delays and $-0.5 \le \Delta_0, \Delta_1 \le 0.5$ representing the fine values of the channel tap delays, $k_{p0}$ and $\Delta_0$ are the coarse and fine values of the FAP, respectively. If prior knowledge of at most 2 peaks in the CIR signal is available, the present method may provide iterative FAP estimation as follows:

1) The present method determines the largest peak in the CIR sequence and estimates ($\hat{\theta}_0$, $\hat{h}_0$) using the FAP estimation method as described above ($\hat{h}_0$ is determined as $\hat{h}_0 = y_{\hat{k}_{p0}}/g_M(-\hat{\Delta}_0)$, where $\hat{k}_{p0}$ and $\hat{\Delta}_0$ are the determined coarse and fine FAP estimates, respectively).
2) The present method determines a new CIR sequence according to $y'_k = y_k - \hat{h}_0 g_M(k-c\hat{\theta}_0)$ (i.e., the contribution of the largest peak is subtracted from the CIR signal) and determines the sum power of its 3 or 5 samples around the detected peak from step 1 above (note that 3 samples may be used if the value of IDFT size M is small to moderate in value while 5 samples may be used if M is large in value, since a larger value of M results in an increased resolution level for CIR signal). If the sum power is below a predefined threshold, only one peak is assumed to exist and the process ends. Otherwise, step 1 above is repeated with the new CIR sequence to estimate the second peak parameters ($\hat{\theta}_1$, $\hat{h}_1$). This determines the initial parameter estimates for the two peaks.
3) Thereafter, for each peak, the present method subtracts the other estimated peak from the CIR and re-estimates its parameters. The method is repeated for both peaks multiple times as needed until convergence of a final value is achieved. The final value of $\hat{\theta}_0$ is the FAP estimate.

Figure 4:
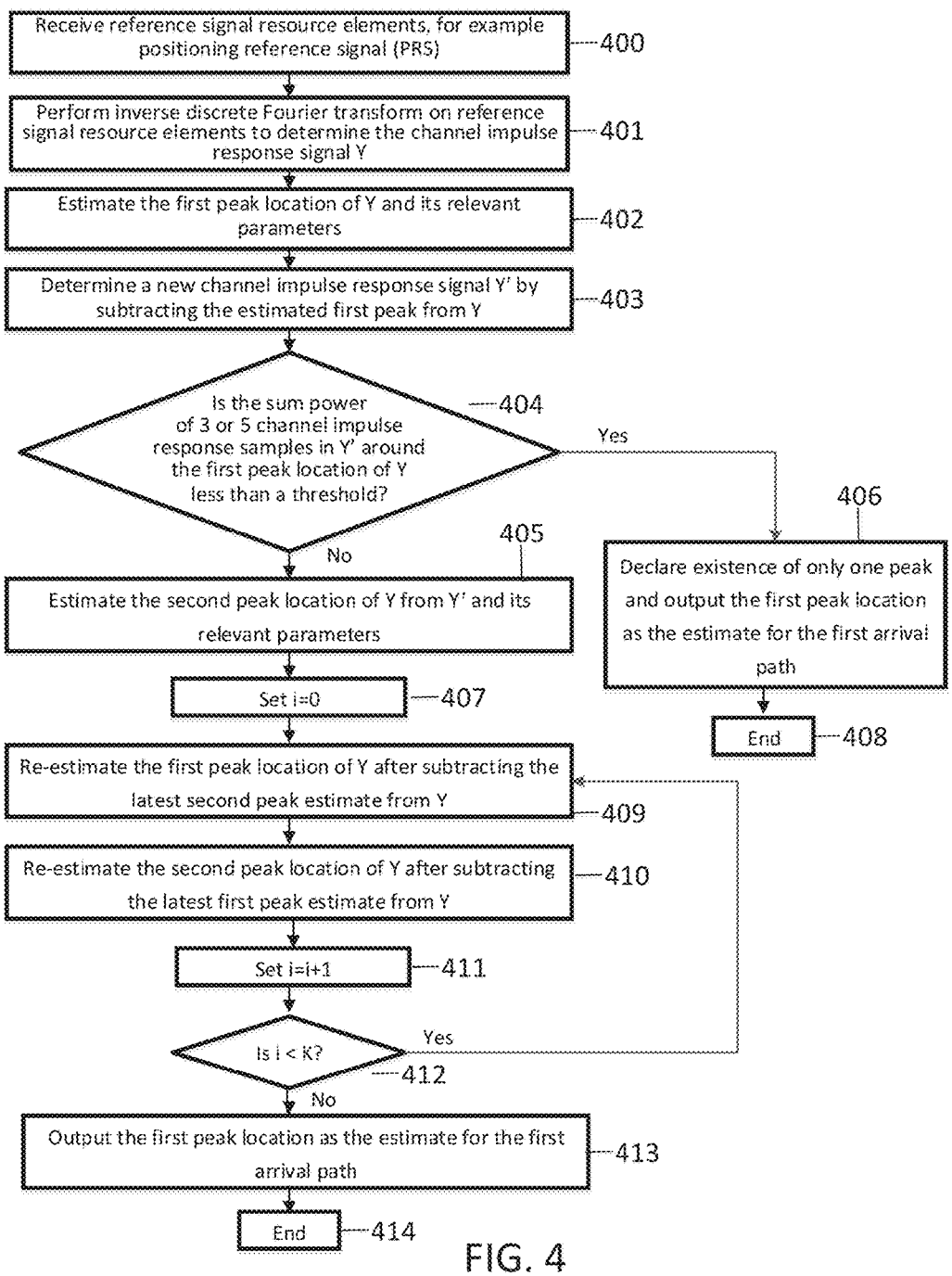
FIG. 4 illustrates an exemplary flowchart of an iterative FAP estimation method for a two-path channel, according to one embodiment.

FIG. 4 illustrates an exemplary flowchart of an iterative FAP estimation method for a two-path channel, according to one embodiment.

Referring to the flowchart of FIG. 4, it is assumed that the first peak is the larger peak among the two peaks in the CIR signal. The present method, at 400, receives a reference signal such as a PRS. At 401, the method performs an IDFT of the reference signal resource elements to determine the CIR signal Y. At 402, the method estimates the first peak location of Y and its relevant parameters. At 403, the method determines a new CIR signal Y' by subtracting the estimated first peak from Y. At 404, the method determines if the sum power of 3 or 5 CIR samples in Y' around the first peak location of Y is less than a threshold. If the sum power of 3 or 5 CIR samples in Y' around the first peak location of Y is less than the threshold, the method determines the existence of only one peak and outputs the first peak location as the estimate for the first arrival path at 406. At 408, the method ends. If the sum power of 3 or 5 CIR samples in Y' around the first peak location of Y is more than the threshold, the method estimates the second peak location of Y from Y' and its relevant parameters at 405. At 407, the method sets an index i to the value zero. At 409, the method re-estimates the first peak location of Y after subtracting the latest second peak estimate from Y. At 410, the method re-estimates the second peak location of Y after subtracting the latest first peak estimate from Y. At 411, the index i is incremented by one. At 412, the method determines if the index i is less than the value of K (the value of K is configurable; more accurate estimates may be obtained with larger value of K, but it may be required to limit K in practice due to limitations in computational and/or hardware resources). If the index i is less than the value of K at 412, the method returns to re-estimating the first peak location of Y after subtracting the latest second peak estimate from Y at 409. If the index i is not less than the value of K at 412, the method outputs the first peak location as the estimate for the first arrival path at 413. At 414, the method ends.

According to one embodiment, the present method provides FAP estimation for a single-path channel and/or a multi-path channel, including detecting a first peak of a CIR signal for estimating a coarse value of the FAP, estimating a fine value of the FAP based on using CIR samples around the FAP location, and combining the estimated coarse value and the estimated fine value to determine an FAP estimate.

Figure 5:
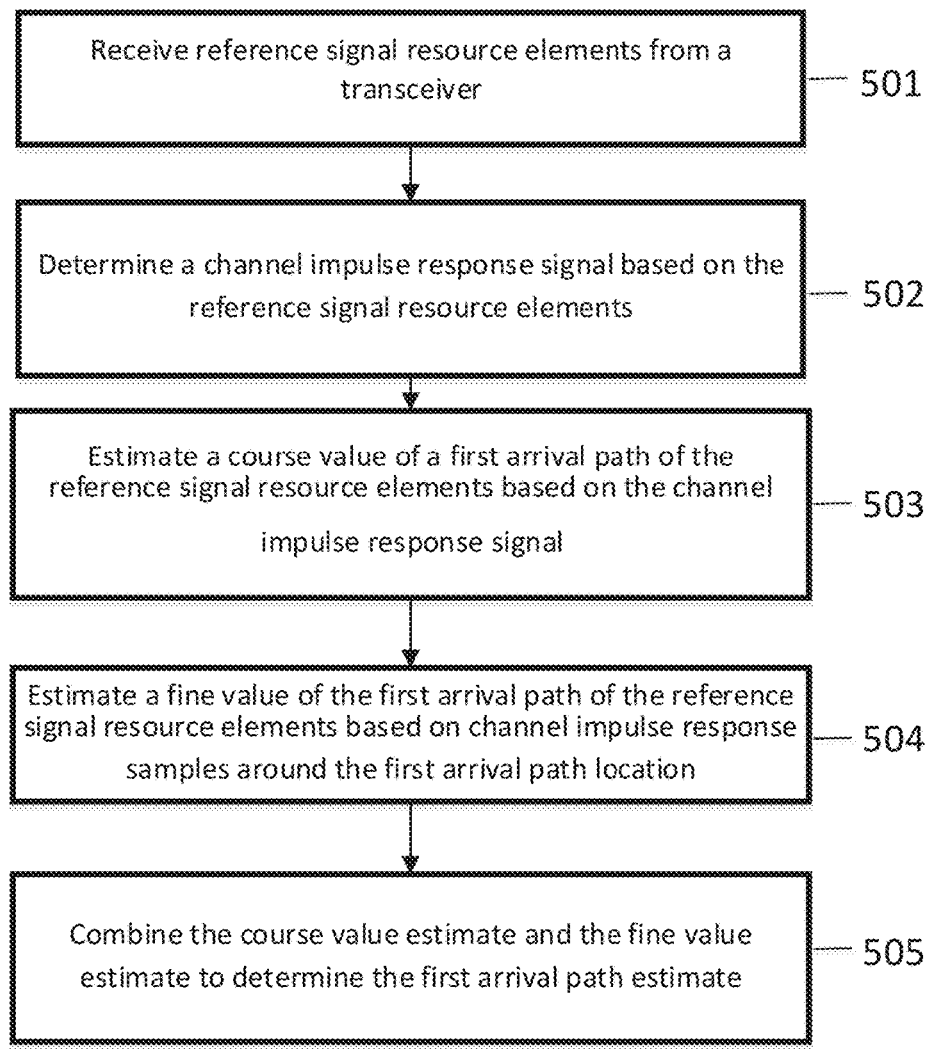
FIG. 5 illustrates an exemplary flowchart of an FAP estimation method, according to one embodiment.

FIG. 5 illustrates an exemplary flowchart of an FAP estimation method, according to one embodiment.

Referring to the flowchart of FIG. 5, the present method, at 501 receives reference signal resource elements from a transceiver. At 502, the method determines a channel impulse response (CIR) signal based on the reference signal resource elements. At 503, the method estimates a coarse value of a FAP of the reference signal resource elements based on the CIR signal. At 504, the method estimates a fine value of the FAP of the reference signal resource elements based on CIR samples around the FAP location. At 505, the method combines the coarse value estimate and the fine value estimate to determine the FAP estimate.

Figures 6, 7:
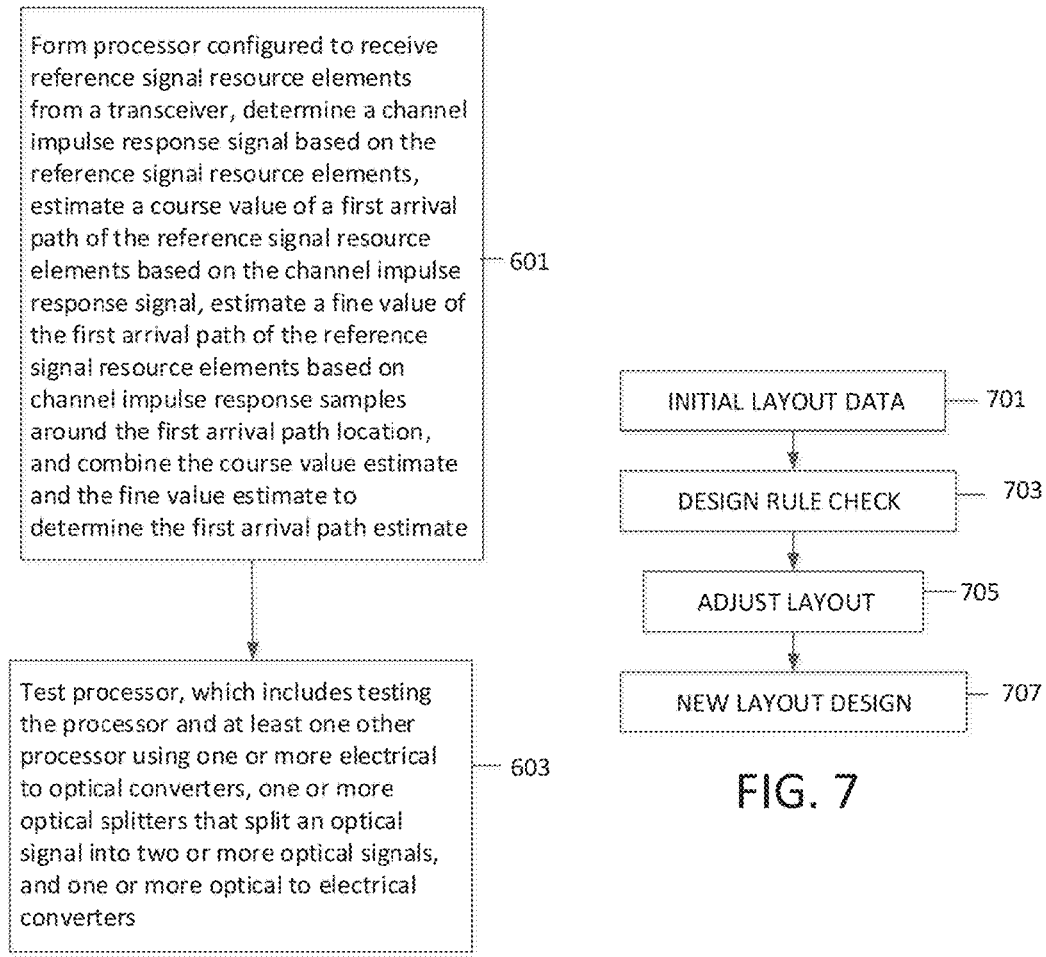
FIG. 6 illustrates an exemplary flowchart of a method of testing a processor of an FAP estimation method, according to one embodiment.
FIG. 7 illustrates an exemplary flowchart of a method of manufacturing a processor of an FAP estimation method, according to one embodiment.

FIG. 6 is a flowchart of a method of testing a processor of the FAP estimation method, according to one embodiment, where the processor is either implemented in hardware or implemented in hardware that is programmed with software.

Referring to FIG. 6, the method, at 601, forms the processor as part of a wafer or package that includes at least one other processor. The processor is configured to receive reference signal resource elements from a transceiver, determine a CIR signal based on the reference signal resource elements, estimate a coarse value of a FAP of the reference signal resource elements based on the CIR signal, estimate a fine value of the FAP of the reference signal resource elements based on CIR samples around the FAP location, and combine the coarse value estimate and the fine value estimate to determine the FAP estimate.

At 603, the method tests the processor, which includes testing the processor and the at least one other processor using one or more electrical to optical converters, one or more optical splitters that split an optical signal into two or more optical signals, and one or more optical to electrical converters.

FIG. 7 is a flowchart of a method of manufacturing a processor of the present FAP estimation method, according to one embodiment. Referring to FIG. 7, the method, at 701, includes an initial layout of data in which the method generates a mask layout for a set of features for a layer of an integrated circuit. The mask layout includes standard cell library macros for one or more circuit features that include a processor. The processor is configured to receive reference signal resource elements from a transceiver, determine a CIR signal based on the reference signal resource elements, estimate a coarse value of a FAP of the reference signal resource elements based on the CIR signal, estimate a fine value of the FAP of the reference signal resource elements based on CIR samples around the FAP location, and combine the coarse value estimate and the fine value estimate to determine the FAP estimate.

At 703, there is a design rule check in which the method disregards relative positions of the macros for compliance to layout design rules during the generation of the mask layout.

At 705, there is an adjustment of the layout in which the method checks the relative positions of the macros for compliance to layout design rules after generating the mask layout.

At 707, a new layout design is made, in which the method, upon detection of noncompliance with the layout design rules by any of the macros, modifies the mask layout by modifying each of the noncompliant macros to comply with the layout design rules, generates a mask according to the modified mask layout with the set of features for the layer of the integrated circuit and manufactures the integrated circuit layer according to the mask.

While the present disclosure has been particularly shown and described with reference to certain embodiments thereof, it will be understood by those of ordinary skill in the art that various changes in form and details may be made therein without departing from the spirit and scope of the present disclosure as defined by the appended claims and their equivalents.

What is claimed is:

1. A method of a user equipment (UE) for increasing accuracy of enhanced positioning of the UE, the method comprising:
    receiving, by the UE, reference signal resource elements from a base station;
    determining a channel impulse response (CIR) signal based on the received reference signal resource elements;
    estimating a coarse value of a first arrival path (FAP) of the reference signal resource elements based on a peak of the CIR signal;
    estimating a fine value of the FAP of the reference signal resource elements based on CIR samples around a location of the FAP;
    combining the coarse value estimate and the fine value estimate to determine the FAP estimate;
    generating a positioning report for the UE based on the determined FAP estimate; and
    transmitting the positioning report to the base station,
    wherein estimating the fine value is further based on interpolating values of at least one of phase information and magnitude information of the CIR samples around a location of the FAP.

2. The method of claim 1, further comprising iteratively updating the FAP estimate.

3. The method of claim 1, wherein the CIR signal is further based on an inverse discrete Fourier transform (IDFT) of the received reference signal resource elements and the peak of the CIR signal is determined according to $$\hat{\Delta} = \frac{M}{\pi} \tan^{-1}\left( \frac{(R_1 - R_{-1})\tan\left(\frac{\pi}{M}\right)}{2R_0 + R_1 + R_{-1}} \right),$$

wherein $y_k$ is the CIR signal.

4. The method of claim 1, wherein estimating the fine value of the FAP is further based on a 3 point interpolation function block, $$\hat{k}_p = \underset{k}{\operatorname{argmax}}|y_k|,$$

where M=cN and represents an inverse discrete Fourier transform (IDFT) size used to generate the CIR signal, c is an integer ≥1 and a power of 2, N is a positive even integer representing an IDFT size for orthogonal frequency division multiplexing (OFDM) symbol generation, and $R_0$, $R_1$ and $R_{-1}$ are correlations determined around the peak of the CIR signal.

5. The method of claim 1, further comprising detecting a peak in the CIR signal based on a sliding time window and an adaptive threshold of an amplitude of the CIR signal.

6. The method of claim 1, further comprising determining an updated CIR signal by subtracting the detected first peak from the CIR signal.

7. The method of claim 6, further comprising determining whether a sum power value of three or five CIR samples of the updated CIR signal is greater than a threshold.

8. The method of claim 7, wherein, if the sum power value is greater than the threshold, determining a second peak location based on the updated CIR signal.

9. A user equipment (UE) with increased accuracy of enhanced positioning, the UE comprising:
    a memory;
    a transceiver; and
    a processor configured to:
        receive, via the transceiver, reference signal resource elements from a base station,
        determine a channel impulse response (CIR) signal based on the received reference signal resource elements,
        estimate a coarse value of a first arrival path (FAP) of the reference signal resource elements based on a peak of the CIR signal,
        estimate a fine value of the FAP of the reference signal resource elements based on CIR samples around the FAP location,
        combine the coarse value estimate and the fine value estimate to determine the FAP estimate,
        generate a positioning report for the UE based on the determined FAP estimate; and
        transmit, via the transceiver, the positioning report to the base station,
    wherein the processor is further configured to estimate the fine value based on interpolating values of at least one of phase information and magnitude information of the CIR samples around a location of the FAP.

10. The UE of claim 9, wherein the processor is further configured to iteratively update the FAP estimate.

11. The UE of claim 9, wherein the processor is further configured to determine the CIR signal based on an inverse discrete Fourier transform (IDFT) of the received reference signal resource elements and the peak of the CIR signal according to $$\hat{k}_P = \underset{k}{\mathrm{argmax}} |y_k|,$$

wherein $y_k$ is the CIR signal.

12. The UE of claim 9, wherein the processor is further configured to estimate the fine value based on a 3 point interpolation function block, $$\hat{\Delta} = \frac{M}{\pi}\tan^{-1}\left(\frac{(R_1 - R_{-1})\tan\left(\frac{\pi}{M}\right)}{2R_0 + R_1 + R_{-1}}\right),$$

where M=cN and represents an inverse discrete Fourier transform (IDFT) size used to generate the CIR signal, c is an integer ≥1 and a power of 2, N is a positive even integer representing an IDFT size for orthogonal frequency division multiplexing (OFDM) symbol generation, and $R_0$, $R_1$ and $R_{-1}$ are correlations determined around the peak of the CIR signal.

13. The UE of claim 9, wherein the processor is further configured to detect a peak in the CIR signal based on a sliding time window and an adaptive threshold of an amplitude of the CIR signal.

14. The UE of claim 9, wherein the processor is further configured to determine an updated CIR signal by subtracting the detected first peak from the CIR signal.

15. The UE of claim 14, wherein the processor is further configured to determine whether a sum power value of three or five CIR samples of the updated CIR signal is greater than a threshold.

16. The UE of claim 15, wherein, if the sum power value is greater than the threshold, the processor is further configured to determine a second peak location based on the updated CIR signal.

* * * * *

UNITED STATES PATENT AND TRADEMARK OFFICE
CERTIFICATE OF CORRECTION

PATENT NO. : 10,070,447 B1
APPLICATION NO. : 15/601366
DATED : September 4, 2018
INVENTOR(S) : Abhik K. Das et al.

Page 1 of 1

It is certified that error appears in the above-identified patent and that said Letters Patent is hereby corrected as shown below:

On the Title Page

Item (54) and in the Specification, Column 1, Lines 1-4, "METHOD AND APPARATUS FOR ENHANCED REFERENCE (RSTD) MEASUREMENT FOR LONG TERM EVOLUTION (LTE) POSITIONING" should be --METHOD AND APPARATUS FOR ENHANCED REFERENCE SIGNAL TIME DIFFERENCE (RSTD) MEASUREMENT FOR LONG TERM EVOLUTION (LTE) POSITIONING--

In the Claims

In Column 14, Claim 3, the equation "$\hat{\Delta} = \frac{M}{\pi}\tan^{-1}\left(\frac{(R_1-R_{-1})\tan(\frac{\pi}{M})}{2R_0+R_1+R_{-1}}\right),$" should be --$\hat{k}_p = \arg\max_k |y_k|,$--

In Column 14, Claim 4, the equation "$\hat{k}_p = \arg\max_k |y_k|,$" should be --$\hat{\Delta} = \frac{M}{\pi}\tan^{-1}\left(\frac{(R_1-R_{-1})\tan(\frac{\pi}{M})}{2R_0+R_1+R_{-1}}\right),$--

Signed and Sealed this
Twenty-fifth Day of June, 2019

Andrei Iancu
*Director of the United States Patent and Trademark Office*